(12) United States Patent
Kikitsu et al.

(10) Patent No.: US 7,141,317 B2
(45) Date of Patent: Nov. 28, 2006

(54) PERPENDICULAR MAGNETIC RECORDING MEDIUM

(75) Inventors: Akira Kikitsu, Yokohama (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 10/668,231

(22) Filed: Sep. 24, 2003

(65) Prior Publication Data
US 2004/0131890 A1 Jul. 8, 2004

(30) Foreign Application Priority Data
Sep. 27, 2002 (JP) ............................. 2002-282439

(51) Int. Cl.
G11B 5/66 (2006.01)
G11B 5/70 (2006.01)

(52) U.S. Cl. ...................................... 428/829; 428/141
(58) Field of Classification Search ................ 428/829
See application file for complete search history.

(56) References Cited

U.S. PATENT DOCUMENTS

| 5,652,054 A | 7/1997 | Kikitsu et al. |
| 5,956,216 A | 9/1999 | Chou |
| 6,174,597 B1 | 1/2001 | Yusu et al. |
| 6,420,058 B1 * | 7/2002 | Haratani et al. .......... 428/845.6 |
| 6,602,620 B1 * | 8/2003 | Kikitsu et al. ........... 428/842.2 |
| 6,770,388 B1 * | 8/2004 | Uwazumi et al. ........... 428/829 |
| 6,841,224 B1 * | 1/2005 | Kamata et al. .......... 428/836.3 |

FOREIGN PATENT DOCUMENTS

JP 59-139138 8/1984

OTHER PUBLICATIONS

B. Gooch, et al. "A High Resolution Flying Magnetic Disk Recording System with Zero Reproduce Spacing Loss," IEEE Transactions on Magnetics, vol. 27, No. 6, Nov. 1991, pp. 4549-4554.

* cited by examiner

Primary Examiner—Holly Rickman
(74) Attorney, Agent, or Firm—Oblon, Spivak, McClelland, Maier & Neustadt, P.C.

(57) ABSTRACT

A perpendicular magnetic recording medium has a substrate, a soft magnetic underlayer formed on the substrate, arrayed soft magnetic dots formed on the soft magnetic underlayer, and a ferromagnetic recording layer formed on the soft magnetic dots and having magnetic anisotropy in a direction perpendicular to a surface of the substrate.

8 Claims, 4 Drawing Sheets

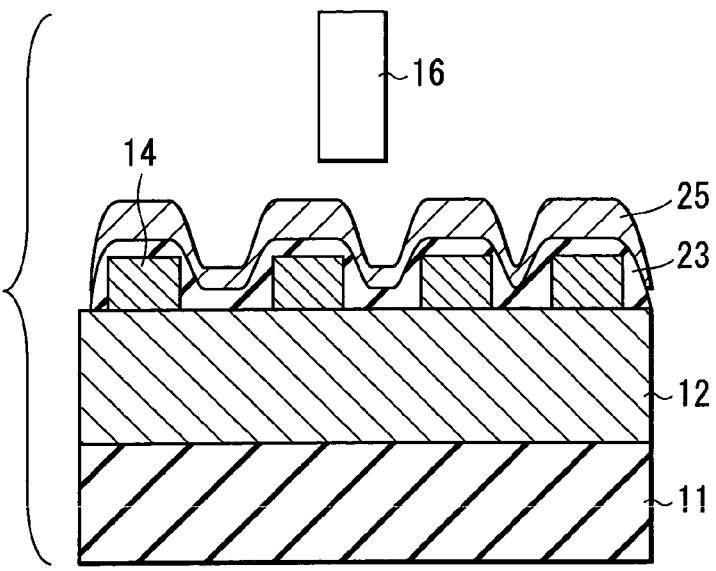
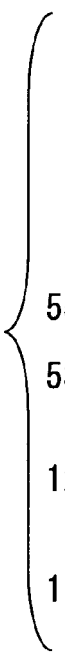
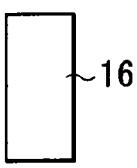
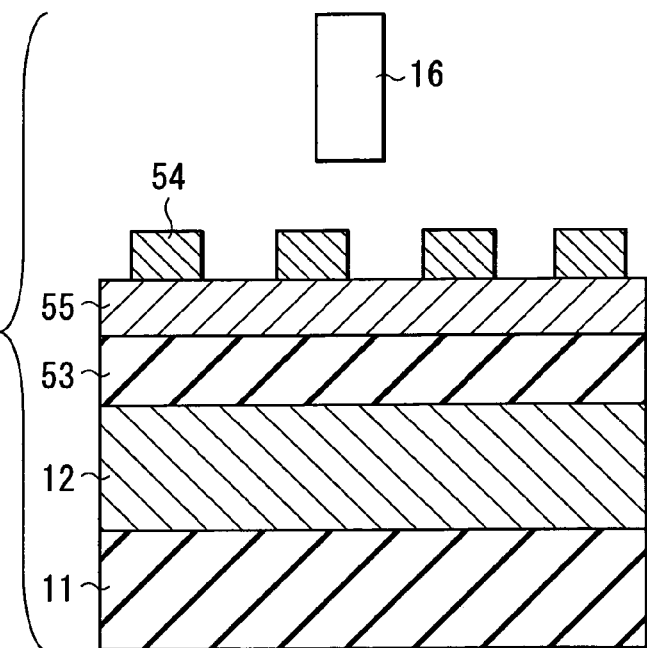
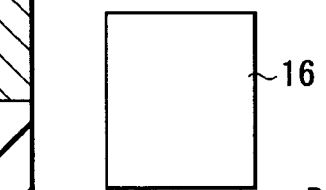
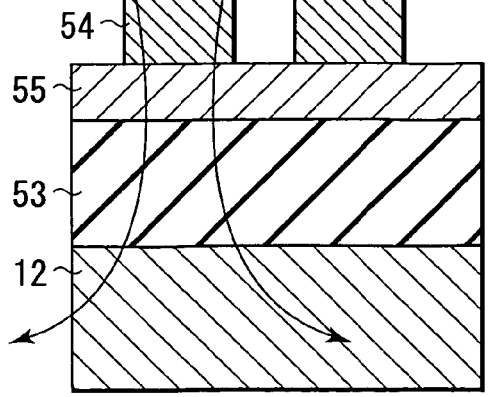
FIG. 4
FIG. 5
FIG. 6

PERPENDICULAR MAGNETIC RECORDING MEDIUM

CROSS-REFERENCE TO RELATED APPLICATIONS

This application is based upon and claims the benefit of priority from the prior Japanese Patent Application No. 2002-282439, filed Sep. 27, 2002, the entire contents of which are incorporated herein by reference.

BACKGROUND OF THE INVENTION

1. Field of the Invention

The present invention relates to a perpendicular magnetic recording medium capable of achieving high-density magnetic recording.

2. Description of the Related Art

For performing high-density magnetic recording, it is necessary to reduce the size of magnetic domains, each of which is a recording unit of information. In the perpendicular magnetic recording medium that is generally used nowadays, information is recorded in a magnetic thin film containing magnetically disrupted magnetic grains. In order to reduce the size of the magnetic domains and to discriminate boundaries thereof for the high-density magnetic recording, it is necessary to reduce the size of magnetic grains.

However, the problem of the thermal fluctuation inhibits the improvement in the recording density of the perpendicular magnetic recording medium. To be more specific, if the magnetic anisotropy energy, which is represented by the product of the magnetic anisotropy energy density Ku and the volume V of a magnetic grain, required to maintain the magnetization of the magnetic grain in a given direction is rendered substantially equal to the thermal fluctuation energy at room temperature, the magnetization is fluctuated with time so as to cause the recorded information to be lost.

For overcoming the thermal fluctuation problem, a patterned media is proposed in, for example, U.S. Pat. No. 5,956,216. The patterned media is prepared by separating a recording layer consisting of a magnetically continuous ferromagnetic thin film into discrete single magnetic domain elements, hereinafter referred to as "ferromagnetic dots". In this case, it is possible to avoid the thermal fluctuation problem because it is possible to make the volume V of each ferromagnetic dot larger than that of the conventional magnetic grain.

However, processing of the ferromagnetic recording layer is absolutely required for obtaining the patterned media. As a result, it becomes problematic that the magnetic characteristics of the ferromagnetic recording layer are damaged; in particular, the magnitude and the direction of the perpendicular magnetic anisotropy are deteriorated. Also, in order to improve the recording and reproducing efficiency, it is necessary to lower the flying height of the write/read head. However, it is difficult to lower the flying height in the patterned media, which has been irregularly processed, unlike the ordinary medium having a substantially flat surface. Therefore, an additional planarization process is required for lowering the flying height in the patterned media.

It should also be noted that the recording layer itself, i.e., the position of the ferromagnetic dot, determines the position at which the magnetic domain is formed in the patterned media. However, it is difficult to locate the magnetic head accurately at the position of the individual ferromagnetic dot. Where the position of the magnetic pole of the write head deviates greatly from the ferromagnetic dot, though a slight positional deviation is allowable, it is impossible to apply a recording magnetic field to a part of the ferromagnetic dot, with the result that effective recording magnetic field strength is lowered so as to render the recording efficiency poor. Also, if a positional deviation takes place between the read head and the ferromagnetic dot in reproduction, the magnetic flux introduced from the ferromagnetic dot into the read head is decreased so as to lower the reproducing efficiency. Therefore, an appreciably large deviation between the magnetic head and the ferromagnetic dot is not allowable.

As described above, the problem that processing deteriorates the magnetic characteristics of the ferromagnetic recording layer was inherent in the conventional patterned media. Also, the conventional patterned media was defective in that it was difficult to lower the flying height of the magnetic head, and that the allowable positional deviation between the write/read head and the ferromagnetic dot of the recording layer is small.

BRIEF SUMMARY OF THE INVENTION

An object of the present invention is to provide a perpendicular magnetic recording medium having a large allowable positional deviation between the write/read head and the recording region in the recording layer and having high reliability.

A perpendicular magnetic recording medium according to a first aspect of the present invention, comprises: a substrate; a soft magnetic underlayer formed on the substrate; arrayed soft magnetic dots formed on the soft magnetic underlayer; and a ferromagnetic recording layer formed on the soft magnetic dots and having magnetic anisotropy in a direction perpendicular to a surface of the substrate.

A perpendicular magnetic recording medium according to a second aspect of the present invention, comprises: a substrate; a soft magnetic underlayer formed on the substrate; a nonmagnetic layer formed on the soft magnetic underlayer; a ferromagnetic recording layer formed on the nonmagnetic layer and having magnetic anisotropy in a direction perpendicular to a surface of the substrate; and arrayed soft magnetic dots formed on the ferromagnetic recording layer.

A perpendicular magnetic recording medium according to a third aspect of the present invention, comprises: a substrate; a soft magnetic underlayer formed on the substrate; a nonmagnetic layer formed on the soft magnetic underlayer; arrayed ferromagnetic recording regions defined by grooves engraved in a ferromagnetic layer formed on the nonmagnetic layer, the ferromagnetic recording regions having magnetic anisotropy in a direction perpendicular to a surface of the substrate; and arrayed soft magnetic dots formed on the respective ferromagnetic recording regions.

A perpendicular magnetic recording medium according to a fourth aspect of the present invention, comprises: a substrate; a soft magnetic underlayer formed on the substrate and having arrayed projections on a surface thereof opposite to the substrate; and a ferromagnetic recording layer formed on the soft magnetic underlayer and having magnetic anisotropy in a direction perpendicular to a surface of the substrate.

In the perpendicular magnetic recording medium according to the first aspect of the present invention, soft magnetic dots are formed on the soft magnetic underlayer, and a ferromagnetic recording layer is formed on the soft magnetic dots. As a result, each of the soft magnetic dots serves to attract the magnetic flux even in the case where the position of the magnetic pole of the head is deviated from the recording region of the ferromagnetic layer, i.e., the region right above the soft magnetic dot. Thus, it is possible to apply a recording magnetic field effectively to the recording region of the ferromagnetic recording layer right above soft magnetic dot so as to improve recording performance. It should also be noted that, in the medium of the first aspect, the soft magnetic material is patterned in place of patterning the ferromagnetic recording layer, with the result that it is possible to prevent the magnetic characteristics from being deteriorated by processing of the ferromagnetic recording layer. It is also possible to control to lower the flying height of the magnetic head because the ferromagnetic recording layer is not patterned.

In the perpendicular magnetic recording medium according to the second aspect of the present invention, a ferromagnetic layer is formed on the soft magnetic underlayer, and soft magnetic dots are formed on the ferromagnetic recording layer. As a result, each of the soft magnetic dots serves to attract the magnetic flux even in the case where the position of the magnetic pole of the head is deviated from the recording region of the ferromagnetic recording layer, i.e., the region right below the soft magnetic dot. Thus, it is possible to apply efficiently the recording magnetic field to the recording region of the ferromagnetic recording layer below the soft magnetic dot so as to improve recording performance. It should also be noted that, since the soft magnetic layer is patterned in place the ferromagnetic recording layer in the medium of the second aspect, it is possible to prevent the magnetic characteristics from being deteriorated by processing of the ferromagnetic recording layer.

In the perpendicular magnetic recording medium according to the third aspect of the present invention, the recording magnetic field can be applied efficiently so as to improve recording performance like the medium according to the second aspect of the present invention. In addition, it is possible to obtain the effect of suppressing fluctuation of magnetization transition extending over a ferromagnetic recording region. Thus, it is possible to achieve high-density magnetic recording with high reliability.

In the perpendicular magnetic recording medium according to the fourth aspect of the present invention, a ferromagnetic recording layer is formed on a soft magnetic underlayer having projections formed thereon. As a result, each of the projections serves to attract the magnetic flux even in the case where the position of the magnetic pole of the head is deviated from the recording region of the ferromagnetic recording layer. Thus, it is possible to apply efficiently the recording magnetic field to the recording region of the ferromagnetic recording layer right above the projection so as to improve recording performance. It should also be noted that the upper surface of the soft magnetic underlayer is patterned in place of patterning the ferromagnetic recording layer, with the result that it is possible to prevent the magnetic characteristics from being deteriorated by processing of the ferromagnetic recording layer. It is also possible to simplify the processes. Further, it is also possible to control to lower the flying height of the magnetic head because the ferromagnetic recording layer is not patterned.

BRIEF DESCRIPTION OF THE SEVERAL VIEWS OF THE DRAWING

FIG. 4 is a cross-sectional view showing the structure of another modification of the perpendicular magnetic recording medium according to the first embodiment of the present invention;

FIG. 5 is a cross-sectional view showing the structure of a perpendicular magnetic recording medium according to a second embodiment of the present invention;

FIG. 6 schematically shows the function and effect produced by the perpendicular magnetic recording medium according to the second embodiment of the present invention;

DETAILED DESCRIPTION OF THE INVENTION

Embodiments of the present invention will now be described with reference to the accompanying drawings.

[First Embodiment]

Figure 1:
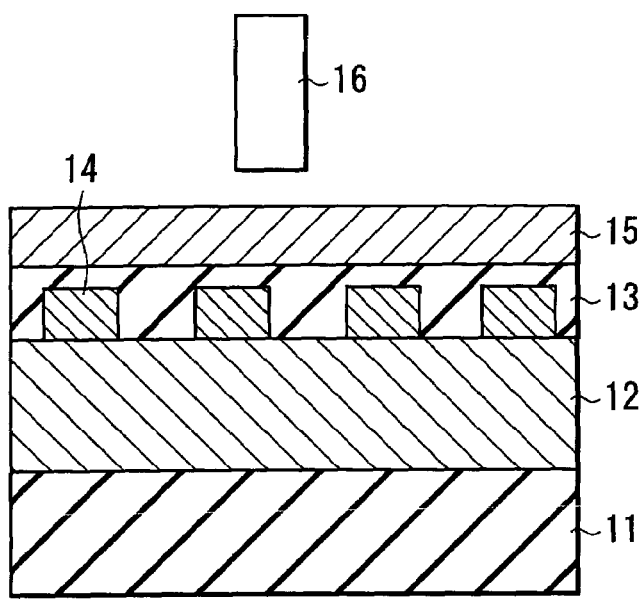
FIG. 1 is a cross-sectional view showing the structure of a perpendicular magnetic recording medium according to a first embodiment of the present invention.

FIG. 1 is a cross-sectional view showing the structure of a perpendicular magnetic recording medium according to a first embodiment of the present invention. As shown in FIG. 1, the perpendicular magnetic recording medium comprises a substrate 11, a soft magnetic underlayer 12 formed on the substrate 11, arrayed soft magnetic dots 14 formed on the soft magnetic underlayer 12, a ferromagnetic recording layer 15 formed on the soft magnetic dots 14 and having magnetic anisotropy in a direction perpendicular to the surface of the substrate 11. In the embodiment shown in the drawing, an intermediate layer 13 is embedded between adjacent soft magnetic dots 14 and is interposed between the soft magnetic dots 14 and the ferromagnetic recording layer 15. The upper surface of the intermediate layer 13 is planarized so as to lower the flying height of the head. It is desirable for the flatness to be 10 nm or less, preferably 5 nm or less, and more preferably 3 nm or less in terms of the average roughness Ra, which is measured by AFM (Atomic Force Microscope). In the first embodiment of the present invention, that region of the ferromagnetic recording layer 15 which is positioned right above each of the soft magnetic dots 14 is used as the recording region.

The function and effect produced by the perpendicular magnetic recording medium according to the first embodiment of the present invention will now be described.

Figure 2:
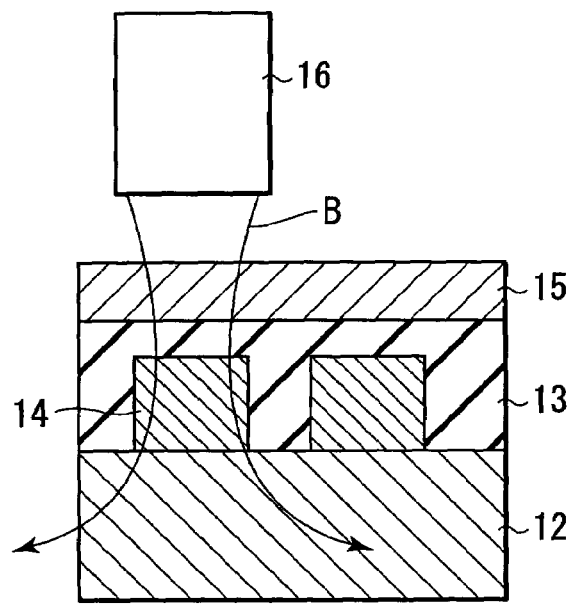
FIG. 2 schematically shows the function and effect produced by the perpendicular magnetic recording medium according to the first embodiment of the present invention.

FIG. 2 shows in a magnified fashion the soft magnetic underlayer 12, the soft magnetic dots 14, the intermediate layer 13, the ferromagnetic recording layer 15, and the magnetic pole 16 of the write head. As shown in FIG. 2, when recording is performed, the magnetic flux B generated from the magnetic pole 16 passes through the soft magnetic dot 14. In this case, the magnetic flux is attracted by the soft magnetic dot 14 even if the magnetic pole 16 is deviated from the recording region of the ferromagnetic recording layer 15 positioned right above the soft magnetic dot 14 as shown in FIG. 1, with the result that the recording region of the ferromagnetic recording layer 15 is preferentially reversed. Therefore, it is possible to increase the allowable limit with respect to the positional deviation of the magnetic pole 16.

To the contrary, if the magnetic pole of the write head is deviated from the ferromagnetic dot in a conventional patterned media, the magnetic flux generated from the magnetic pole passes only partly through the ferromagnetic dot. In this case, it is impossible to achieve recording unless magnetization reversal taking place in a part of the ferromagnetic dot is transmitted to the entire region within the ferromagnetic dot. In order to bring about the particular magnetization process without fail, it is necessary to apply a magnetic field higher than that in the case where there is no positional deviation in the magnetic pole and a magnetic field. In addition, it is possible for the magnetization reversal not to be transmitted to the entire region within the ferromagnetic dot. It follows that, in the conventional patterned media, the allowable limit in the positional deviation of the magnetic pole from the ferromagnetic dot is not appreciably large.

It should also be noted that the perpendicular magnetic recording medium according to the first embodiment of the present invention, in which the soft magnetic film is processed, differs in the processing object from the conventional patterned media. It is generally known to the art that, if a ferromagnetic film is finely processed, crystallinity of the film is collapsed and anisotropy energy is lowered. The anisotropy energy is very important magnetic characteristics for the ferromagnetic recording layer. The deterioration of the anisotropy energy leads to a marked deterioration in the characteristics of the perpendicular magnetic recording medium. What should also be noted is that, since the ferromagnetic recording layer is formed of a film consisting of fine particles and a nonmagnetic substance filling the space among the fine particles, it is difficult to process finely the ferromagnetic recording layer with high accuracy.

On the other hand, the soft magnetic film is essentially low in anisotropy energy and, thus, the decrease in the anisotropy energy caused by processing of the soft magnetic film does not pose a serious problem. Also, where the soft magnetic film is amorphous or nanocrystalline, the film is highly excellent in processability. Even where the soft magnetic film is polycrystalline, the crystal grains are not disrupted as strictly as in the ferromagnetic recording layer, i.e., the crystal grains are under a state that exchange coupling is allowed to act among them, which lead to superior processability. It follows that the perpendicular magnetic recording medium according to the present invention is superior to the conventional patterned media in magnetic characteristics and processability.

It should also be noted that, in the perpendicular magnetic recording medium according to the embodiment shown in FIG. 1, the upper surface of the ferromagnetic recording layer 15 is planarized so as to produce the merit that the flying height can be controlled easily.

In the embodiments of the present invention, the substrate 11 is a disk formed of a hard material such as metal, glass and ceramics.

A ferromagnetic recording material generally used in the perpendicular magnetic recording medium is used for the ferromagnetic recording layer 15. To be more specific, a material having high saturation magnetization Is and great magnetic anisotropy is adapted for the ferromagnetic recording layer. In this respect, it is desirable to use a magnetic metal material, e.g., at least one type of the materials selected from the group consisting of Co, Pt, Sm, Fe, Ni, Cr, Mn, Bi, Al and an alloy thereof. Among these materials, it is desirable to use Co-based alloys having great crystalline magnetic anisotropy, particularly, alloys based on CoPt, SmCo or CoCr and ordered alloys such as FePt and CoPt, more particularly, Co—Cr, Co—Pt, Co—Cr—Ta, Co—Cr—Pt, Co—Cr—Ta—Pt, $Fe_{50}Pt_{50}$, $Fe_{50}Pd_{50}$, and $Co_3Pt_1$. In addition, the material used for the ferromagnetic recording layer 15 can be selected from a wide range of materials including, for example, a rare earth-transition metal alloy such as Tb—Fe, Tb—Fe—Co, Tb—Co, Gd—Tb—Fe—Co, Gd—Dy—Fe—Co, Nd—Fe—Co and Nd—Tb—Fe—Co; a multi-layered film comprising a magnetic layer and a noble metal layer such as Co/Pt and Co/Pd; half metals such as PtMnSb; and magnetic oxides such as Co ferrite and Ba ferrite.

In order to control the magnetic characteristics, it is possible for the above-described magnetic metal to be alloyed with at least one element selected from the magnetic elements of Fe and Ni. Also, it is possible to add to these metals and alloys an additive for improving the magnetic characteristics such as Cr, Nb, V, Ta, Mo, Ti, W, Hf, In, Zn, Al, Mg, Si or B, or a compound between any of these elements and an additional element selected from the group consisting of oxygen, nitrogen, carbon and hydrogen.

The magnetic anisotropy of the ferromagnetic recording layer may include a longitudinal magnetic anisotropic component as far as the perpendicular magnetic anisotropic component is predominant.

The thickness of the ferromagnetic recording layer is not particularly limited in the present invention, though, in view of the high-density recording, it is desirable for the thickness of the ferromagnetic recording layer to be 100 nm or less, preferably 50 nm or less, and more preferably 20 nm or less. On the other hand, in order to ensure formation of a thin film, the thickness of the ferromagnetic recording layer should be 0.1 nm or more.

It is desirable for the ferromagnetic recording layer to be formed of a composite material consisting of magnetic grains and a nonmagnetic substance filling the space among the magnetic grains because it is possible in this case to achieve a high-density magnetic recording with the magnetic grain forming the reversal unit.

The soft magnetic underlayer 12 is magnetically coupled with the magnetic domain within the ferromagnetic recording layer 15 or with the write/read head for performing efficient perpendicular magnetic recording to or reproducing from the ferromagnetic recording layer 15. The magnetic anisotropy direction of the soft magnetic underlayer 12 may be a perpendicular direction, an in-plane circumferential direction, or an in-plane radial direction, or a resultant direction thereof. It suffices that the soft magnetic underlayer 12 has coercivity high enough for the spin direction thereof to be changed by head magnetic field in recording so as to form a closed magnetic circuit. In general, it is desirable that the coercivity of the soft magnetic underlayer 12 be several kOe or less, preferably 1 kOe or less, and more preferably 500 Oe or less.

In view of the crystallinity and the controllability for the fine structure, it is desirable that the fine structure of the soft magnetic underlayer 12 be similar to that of the ferromagnetic recording layer 15. However, the soft magnetic underlayer 12 may have another fine structure in the case where the magnetic characteristics are preferentially taken into consideration. For example, it is conceivable to use in combination an amorphous soft magnetic underlayer and a crystalline ferromagnetic recording layer, and vice versa. Also, it is possible for the soft magnetic underlayer 12 to be of a so-called granular structure, in which soft magnetic fine grains are dispersed in a nonmagnetic matrix, or to be formed of a plurality of layers differing in the magnetic characteristics, e.g., a multi-layered film of a soft magnetic layer/nonmagnetic layer.

It is also possible to form an additional underlayer between the soft magnetic underlayer and the substrate in order to control the crystallinity and the magnetic characteristics of the soft magnetic underlayer. The additional underlayer may be formed of a magnetic material, a nonmagnetic material, or a composite material thereof.

It is desirable to form the intermediate layer 13 between the soft magnetic dots 14 and the ferromagnetic recording layer 15. The intermediate layer 13 may be of a single layer structure or a multi-layered structure. The intermediate layer 13 may be formed of a magnetic material or a nonmagnetic material. A nonmagnetic intermediate layer 13 is desirable in view of suppressing formation of magnetic domains providing noise sources by the effect of disruption of the magnetic material. Where the intermediate layer 13 is formed of a magnetic material, it suffices to use a magnetic layer having coercivity lower than that of the ferromagnetic recording layer 15. Even in this case, it is possible to obtain the effect close to that obtained in the case of using a nonmagnetic material. The thickness of the intermediate layer 13 is not particularly limited in the present invention. However, in the case where the intermediate layer 13 is formed of a nonmagnetic material, it is undesirable for the distance between each of the soft magnetic dots 14 and the ferromagnetic recording layer 15 to be larger than 100 nm because the magnetic interaction between the soft magnetic underlayer 12 and the magnetic pole 16 of the write/read head is weakened.

The intermediate layer 13 formed of a nonmagnetic material also plays the role of controlling the crystal structure of the magnetic portion or, as desired, the nonmagnetic portion constituting the ferromagnetic recording layer 15 or the role of preventing impurities from mixing the ferromagnetic recording layer 15 from other layers. For example, it is possible to control the crystal state of the magnetic portion in the case of using an intermediate layer having a lattice constant close to that of the magnetic portion having desired crystal orientation. Also, it is possible to control the crystallinity or the amorphous state of the magnetic portion or the nonmagnetic portion in the case of using an amorphous intermediate layer having a certain surface energy. It is possible to form an additional intermediate layer between the intermediate layer 13 and the soft magnetic dots 14. In this case, the functions can be distributed to the plural intermediate layers so as to increase effects. For example, it is possible to form an additional intermediate layer for controlling the crystallinity of the ferromagnetic recording layer 15 on a seed layer (intermediate layer) of a small grain size in order to reduce the size of crystal grains contained in the ferromagnetic recording layer 15. Also, for preventing the mixing of impurities from another layer, it suffices to use a thin film having a small lattice constant or having a high-density as the intermediate layer 13.

It is also possible for the intermediate layer to perform the functions described above. For example, it is possible for the magnetic intermediate layer to perform the function of controlling the crystallinity of the magnetic portion. It is also possible for the intermediate layer to be a surface modified layer of the substrate formed by ion plating, doping within a nitrogen gas atmosphere, or neutron irradiation. In this case, the process of thin film deposition need not be employed, which brings about advantage in manufacturing the medium.

The soft magnetic dots 14 should satisfy the magnetic characteristics similar to those of the soft magnetic underlayer 12. The soft magnetic dot 14, which constitutes the portion performing a part of the function of the soft magnetic underlayer 12 in perpendicular magnetic recording, is featured in the configuration and the position within the perpendicular magnetic recording medium.

Unlike the ordinary soft magnetic underlayer, the soft magnetic dots do not form a continuous film. As schematically shown in FIG. 1, the soft magnetic dots 14 each having a prescribed size are arranged apart from each other by a certain distance so as to form a discrete pattern. For performing tracking or for performing data reproduction at a high speed, it is desirable that the soft magnetic dots 14 be arrayed in the tracking direction and that the soft magnetic dots 14 be processed so as to determine the size and space thereof in a manner to facilitate encoding. The perpendicular magnetic recording medium of the present invention differs from the conventional patterned media, in which the ferromagnetic layer is patterned, in that the soft magnetic layer is patterned.

The soft magnetic dots 14 are formed between the soft magnetic underlayer 12 and the ferromagnetic recording layer 15. The soft magnetic dots 14 may be in contact with the soft magnetic underlayer 12 as shown in FIG. 1 or not be in contact with the soft magnetic underlayer 12. Where each of the patterned soft magnetic dots 14 is in contact with the soft magnetic underlayer 12, the effect of preventing the thermal fluctuation of the soft magnetic dot 14 is greatly improved. Where each of the soft magnetic dots 14 is not in contact with the soft magnetic underlayer 12, it is possible to fully utilize recording efficiency and reproducing efficiency in, particularly, the case where the distance between them is not larger than 10 nm. In this case, a nonmagnetic film having a thickness of 10 nm or less is interposed between the soft magnetic dots 14 and the soft magnetic underlayer 12, for example.

The soft magnetic dots 14 can be formed by the method known as the fabrication method of the patterned media. To be more specific, it is possible to process a continuous film by utilizing the lithography technology employed in manufacturing a semiconductor device, to process a continuous film by forming a mask formed by using a self-assembly diblock copolymer such as PS-PMMA (polystyrene-polymethyl methacrylate), or to directly process a continuous film by means of, for example, particle beam irradiation. It is also possible to employ the method of removing the undesired portion by the lift-off method or the method of embedding a soft magnetic material for the soft magnetic dots 14 in the holes formed in advance.

It is possible to form the soft magnetic dots 14 by applying any of the methods referred to above to the surface region of the soft magnetic underlayer 12 on the side opposite to that of the substrate. In this case, the soft magnetic underlayer and the soft magnetic dots, which form an integral structure made of the same material, differ from each other in the produced function.

Figure 3:
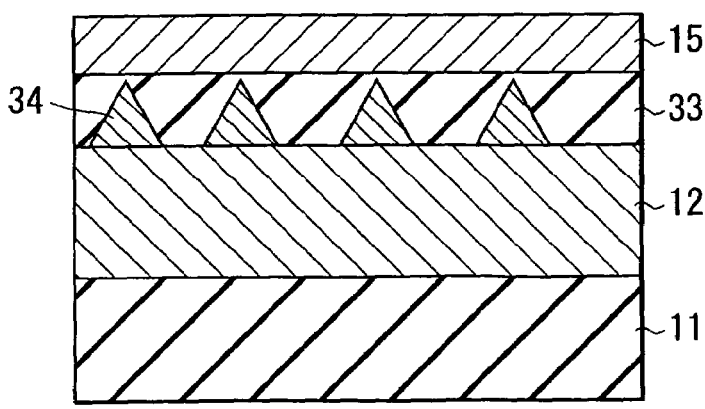
FIG. 3 is a cross-sectional view showing the structure of a modification of the perpendicular magnetic recording medium according to the first embodiment of the present invention.

Each of the soft magnetic dots 14 may have a rectangular cross-sectional shape as shown in FIG. 1 or a triangular cross-sectional shape as shown in FIG. 3 (for example, a conical or pyramidal shape), or trapezoid cross-sectional shape. Also, each of the soft magnetic dots 14 may have a combined cross-sectional shape, e.g., a combination of a triangle and a rectangle below the triangle. Where each of the soft magnetic dots 34 has a sharp tip portion as shown in FIG. 3, the magnetic flux is concentrated on the tip portion of each of the soft magnetic dots 34 so as to improve both recording efficiency and reproducing efficiency.

The interface between the intermediate layer 13 and the ferromagnetic recording layer 15 may be flat as shown in FIG. 1. Alternatively, it is also possible to employ the structure that the intermediate layer 23 and the ferromagnetic recording layer 25 are formed in a manner to conform with the steps produced by the soft magnetic dots 14, as shown in FIG. 4. The former case is desirable because it is possible to suppress the flying height of the head, and the latter case is desirable because the manufacturing cost can be lowered. Which to select is determined by the specification of the system using the perpendicular magnetic recording medium of the present invention.

[Second Embodiment]

FIG. 5 is a cross-sectional view showing the structure of the perpendicular magnetic recording medium according to a second embodiment of the present invention. As shown in the drawing, the perpendicular magnetic recording medium comprises a substrate 11, a soft magnetic underlayer 12 formed on the substrate 11, a nonmagnetic intermediate layer 53 formed on the soft magnetic underlayer 12, a ferromagnetic recording layer 55 formed on the nonmagnetic intermediate layer 53 and having magnetic anisotropy in a direction perpendicular to the upper surface of the substrate 11, and arrayed soft magnetic dots 54 formed on the ferromagnetic recording layer 55. Incidentally, the portions equal to those in FIG. 1 are denoted by the same reference numerals.

In the perpendicular magnetic recording medium according to the second embodiment, the soft magnetic dots 54 are formed on the ferromagnetic recording layer 55. The function performed by the particular perpendicular magnetic recording medium will now be described with reference to FIG. 6. Like FIG. 2, the magnetic flux B generated from the magnetic pole is concentrated on the portion where the soft magnetic dot 54 is present. As a result, the magnetization reversal takes place in only that portion of the recording region of the ferromagnetic recording layer 55 positioned below the soft magnetic dot 55 so as to make it possible to increase the allowable limit in positional deviation of the magnetic pole 16 of the write head as in the first embodiment.

Figure 7:
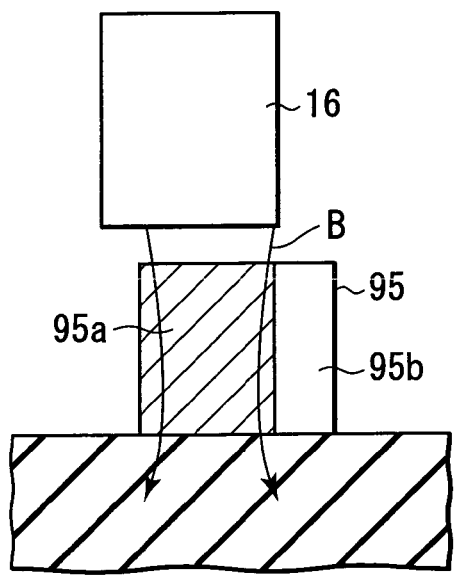
FIG. 7 is a cross-sectional view schematically showing recording process in the case where there is a deviation between the write head and the recording pattern in a conventional patterned media.

To the contrary, where the recording magnetic field is applied in a conventional patterned media at timing deviated from the pattern of the ferromagnetic dot, the magnetization reversal takes place in a part of the dot and is transmitted to the entire region within the dot. The particular process is schematically shown in FIG. 7. It should be noted that, since the position of the magnetic pole 16 is deviated, the magnetic flux B passes through only a part of the patterned ferromagnetic recording region 95. The hatched portion 95a denotes a region in which the magnetization reversal takes place first. It is impossible to perform recording unless the magnetization reversal is transmitted to the entire ferromagnetic recording region 95. In this case, the magnetization reversal is not transmitted to a portion 95b of the ferromagnetic recording region 95. It follows that a magnetic field having strength higher than that in the case where the magnetic field is applied to the entire of the ferromagnetic recording region 95. Also, since it is possible that the magnetization reversal region is not transmitted in some cases, the allowable limit of the deviation is not reasonably large.

Figure 8:
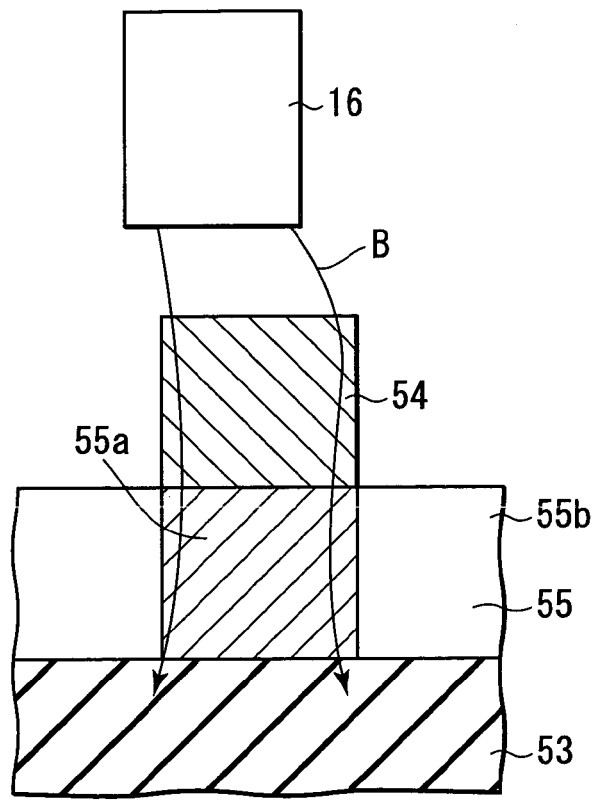
FIG. 8 is a cross-sectional view schematically showing recording process in the case where there is a deviation between the write head and the recording pattern in the perpendicular magnetic recording medium of the present invention.

On the other hand, FIG. 8 covers the case of the perpendicular magnetic recording medium according to the second embodiment. Although the position of the magnetic pole 16 is deviated as in FIG. 7, the patterned soft magnetic dots 54 are positioned between the magnetic pole 16 and the ferromagnetic recording layer 55. As a result, the magnetic flux B is attracted to the soft magnetic dot 54 and, thus, in the ferromagnetic recording layer 55, the magnetization is reversed in the entire recording region 55a positioned right under the pattern of the soft magnetic underlayer 54. Incidentally, a reference numeral 55b denotes a non-recorded region. It follows that the perpendicular magnetic recording medium according to the second embodiment can increase the allowable limit of deviation of the magnetic pole 16 so as to make it possible to obtain effects superior to that of the conventional patterned media manufactured by patterning the ferromagnetic recording layer.

The perpendicular magnetic recording medium according to the second embodiment is advantageous over the conventional patterned media in other respects, too, as described previously in conjunction with the first embodiment. To reiterate, the second embodiment also permits improving processing accuracy and suppressing deterioration of magnetic characteristics.

No problem is generated in the perpendicular magnetic recording medium according to the second embodiment in respect of controllability of the flying height, as described in the following. In the ordinary perpendicular magnetic recording medium, it is necessary to decrease the flying height because the strength of the generated magnetic field is lowered by diffusion of the magnetic flux. However, the situation in the second embodiment is equivalent to the case where the tip of the magnetic pole 16 is in direct contact with the ferromagnetic recording layer 55, as apparent from FIG. 6. In other words, the perpendicular magnetic recording medium is under the state that the flying height is zero. Therefore, it suffices for the actual flying height to be determined such that the magnetic flux B is not diffused toward each of the soft magnetic dots 54. To this end, it suffices that the flying height is shorter than the distance between the adjacent soft magnetic dots 54. In the case of the patterned media that is assumed nowadays, the distance between the adjacent soft magnetic dots is about 10 nm if a bit is recorded in a single dot. On the other hand, the flying height required for the magnetic recording medium available nowadays is not larger than 10 nm. Thus, it is reasonable to state that the flying height can be controlled in the perpendicular magnetic recording medium according to the second embodiment.

Incidentally, if each of the soft magnetic dots 54 is shaped conical or pyramidal as shown in FIG. 4, the magnetic flux is concentrated on a portion having a small radius of curvature. Thus, it is possible to suppress the divergence of the magnetic flux so as to further increase the flying height.

The various items described previously in conjunction with the first embodiment can also be applied to the perpendicular magnetic recording medium according to the second embodiment.

[Third Embodiment]

Figure 9:
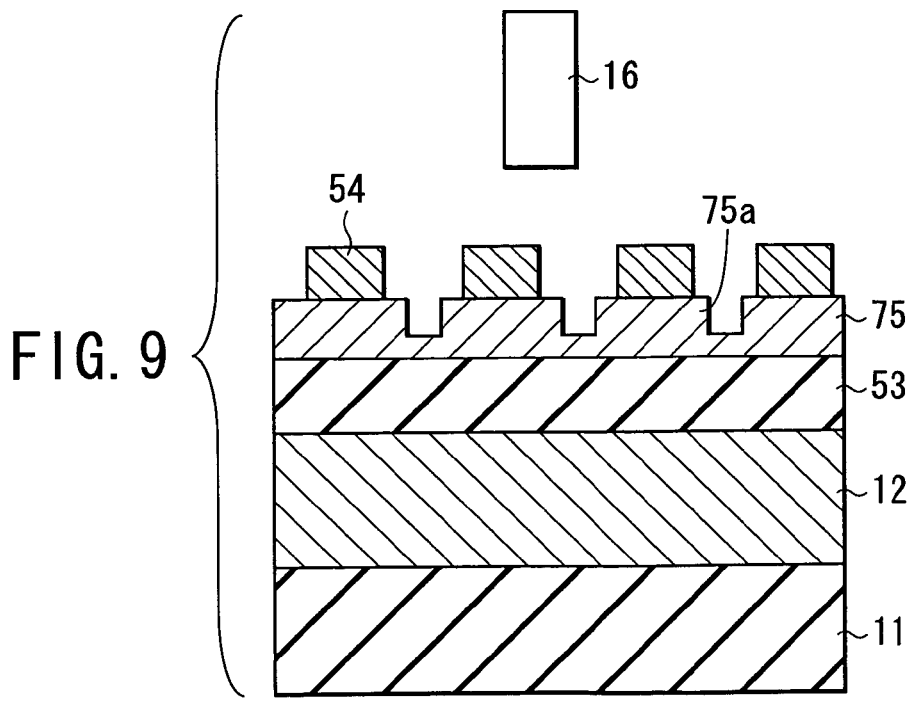
FIG. 9 is a cross-sectional view showing the structure of a perpendicular magnetic recording medium according to a third embodiment of the present invention.

FIG. 9 is a cross-sectional view showing the structure of a perpendicular magnetic recording medium according to a third embodiment of the present invention. As shown in the drawing, the perpendicular magnetic recording medium a substrate 11, a soft magnetic underlayer 12 formed on the substrate 11, a nonmagnetic layer 53 formed on the soft magnetic underlayer 12, arrayed ferromagnetic recording regions 75a defined by grooves 75b engraved in a ferromagnetic layer formed on the nonmagnetic layer 53, each ferromagnetic recording region 75a having magnetic anisotropy in a direction perpendicular to a surface of the substrate 11, and arrayed soft magnetic dots 54 formed on the respective ferromagnetic recording regions 75a.

In the perpendicular magnetic recording medium according to the third embodiment, the surface of the ferromagnetic recording layer 75 is processed so as to form the grooves 75b, thereby forming ferromagnetic recording regions 75a. By processing a part of the surface of the ferromagnetic recording layer to form a pattern, it is possible to obtain an effect of suppressing fluctuation in magnetization transition extending over a particular ferromagnetic recording region 75a. In this case, it is unnecessary for the shape of the ferromagnetic recording region 75a to be equal to the shape of the soft magnetic dot 54. If the shape of the ferromagnetic recording region 75a is related to some extent to the shape of the soft magnetic dot 54, the pattern of the recording magnetic domain is not disturbed and, thus, medium noise is not generated. It should be noted, however, that, with progress in processing of the surface of the ferromagnetic recording layer, the magnetic recording medium is rendered closer to a conventional patterned media so as to give rise to the problem that the magnetic characteristics are deteriorated. However, the detrimental effect given to processing accuracy is small because the processing accuracy is determined by the soft magnetic dots 54. In the perpendicular magnetic recording medium according to the third embodiment, it is possible to obtain the effects similar to those described previously in conjunction with the first and second embodiments in the other respects such as the allowable limit of deviation of the magnetic pole and flying height.

Figure 10:
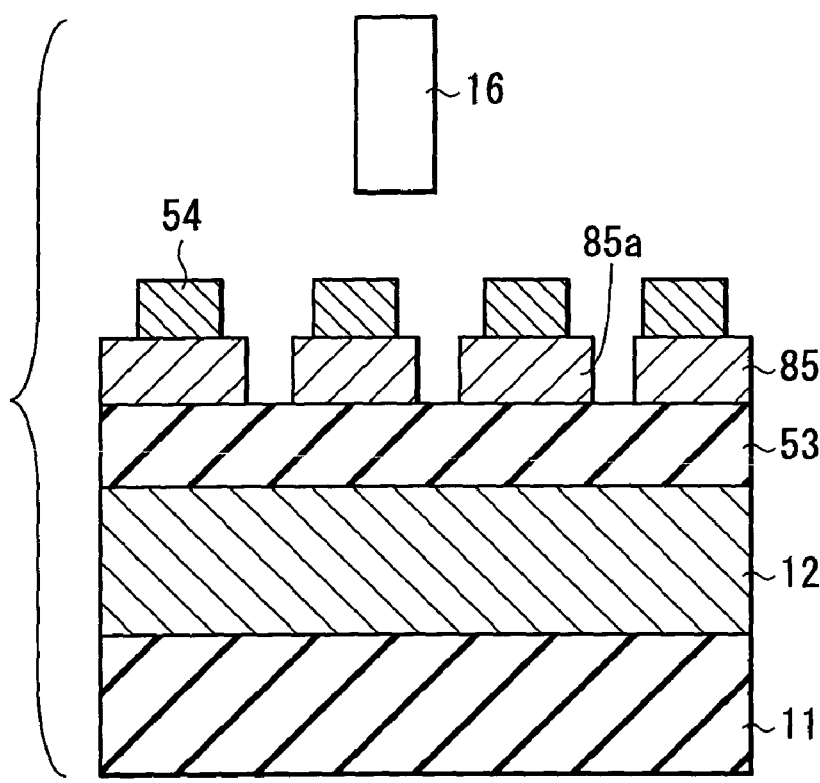
FIG. 10 is cross-sectional view showing the structure of a modification of the perpendicular magnetic recording medium according to the third embodiment of the present invention.

FIG. 10 is a cross-sectional view showing the structure of the perpendicular magnetic recording medium according to a modification of the third embodiment. In this modification, the ferromagnetic recording regions 85a are completely separated. As shown in the drawing, the perpendicular magnetic recording medium for this modification comprises a substrate 11, a soft magnetic underlayer 12 formed on the substrate, a nonmagnetic intermediate layer 53 formed on the soft magnetic underlayer 12, arrayed ferromagnetic recording regions 85a defined by grooves 85b engraved in a ferromagnetic layer formed on the nonmagnetic layer 53, the grooves 85b being processed to reach the nonmagnetic layer 53, each ferromagnetic recording region 85a having magnetic anisotropy in a direction perpendicular to a surface of the substrate 11, and arrayed soft magnetic dots 54 formed on the respective ferromagnetic recording regions 85.

In the perpendicular magnetic recording medium shown in FIG. 10, the ferromagnetic recording layer is processed throughout the entire thickness, by which the effect of suppressing further effectively the fluctuation of the magnetization transition extending over a particular ferromagnetic recording region 85a. In this case, it is unnecessary for the shape of each ferromagnetic recording regions 85a to be equal to the shape of each of the soft magnetic dots 54. If the shape of the ferromagnetic recording region 85a is related to some extent to the shape of the soft magnetic dot 54, the pattern of the recording magnetic domain is not disturbed and, thus, medium noise is not generated. It should be noted, however, that the problem is generated in terms of deterioration in magnetic characteristics as in the conventional patterned media. However, the detrimental effect given to processing accuracy is small because the processing accuracy is determined by the soft magnetic dots 54. In the perpendicular magnetic recording medium according to the modification of the third embodiment, it is possible to obtain the effects similar to those described previously in conjunction with the first and second embodiments in the other respects such as the allowable limit in the deviation of the magnetic pole and flying height.

It is desirable for each of the ferromagnetic recording regions 75a and 85a included in the perpendicular magnetic recording media shown in FIGS. 9 and 10 to be formed of a composite material consisting of magnetic particles and nonmagnetic material present in the space among the magnetic particles because, in this case, it is possible to achieve high-density magnetic recording with the magnetic particle forming the reversal unit. However, where the recording layer is patterned partly or entirely in thickness direction as described above, it is not absolutely necessary for the nonmagnetic substance to be present. Also, it is possible to use a continuous amorphous magnetic material such as a rare earth-transition metal alloy.

The various items described previously in conjunction with the first and second embodiments can also be applied to the perpendicular magnetic recording medium according to the third embodiment.

EXAMPLES

Examples of the present invention will now be described with reference to the accompanying drawings.

Example 1

FIG. 1 is a cross-sectional view schematically showing the structure of the perpendicular magnetic recording medium for this Example. The perpendicular magnetic recording medium was manufactured as follows. In the first step, a NiAl film (not shown) having a thickness of 10 nm, a soft magnetic underlayer 12 of a FeSiAl film having a thickness of 100 nm, and a carbon film (not shown) having a thickness of 2 nm were successively deposited by sputtering on a glass disk substrate 11 having a diameter of 2.5 inches. The NiAl film was intended to control the orientation of the FeSiAl film formed thereon. Then, a resist was applied thereon, followed by forming a resist mask, in which square openings each sized at 40 nm-square were arrayed at an interval of 40 nm in the circumferential direction of the disk, by the technology similar to ordinary lithography.

In the next step, a CoZrNb film, which was used for forming the soft magnetic dots 14, was deposited in a thickness of 30 nm on the resist mask so as to fill the square openings. Further, the residual resist and the CoZrNb film on the residual resist were lifted off so as to form soft magnetic dots 14 in which square CoZrNb dots each sized at 40 nm-square were arrayed at an interval of 40 nm in the circumferential direction of the disk. Incidentally, it is possible for the carbon film to be left below the soft magnetic dots 14. However, the thickness of the residual carbon film has a thickness of 2 nm and, thus, it is possible to obtain sufficient recording efficiency and reproducing efficiency. Then, $Al_2O_3$ was deposited in a thickness of 10 nm so as to form a nonmagnetic intermediate layer 13, followed by planarizing the nonmagnetic intermediate layer 13 by chemical mechanical polishing and subsequently depositing a Pt film (not shown) having a thickness of 1 nm, a ferromagnetic recording layer 15 consisting of a CoCrPt film having a thickness of 15 nm and a protective film (not shown) consisting of a carbon film having a thickness of 5 nm were deposited in this order. The Pt film was intended to control the orientation of the CoCrPt film formed thereon.

The magnetic characteristics of the soft magnetic underlayer 12 and the soft magnetic dots 14 were examined by VSM (Vibrating Sample Magnetometer). The hysteresis was found to be a two-step loop, supporting that exchange coupling was not exerted. A sample of the ferromagnetic recording layer 15 alone was prepared separately so as to examine the magnetic characteristics of the recording layer itself. The sample had a perpendicular coercivity of 4.5 kOe and a longitudinal coercivity of 0.3 kOe. Also, the activation volume of the same sample, which was examined by changing the magnetic field sweep velocity of VSM, was found to be about two times as much as the crystal grain size in the recording layer. Although the result implies that exchange coupling among the grains is not sufficiently disrupted, high stability against the thermal fluctuation can be expected.

A recording/reproducing test was applied to the magnetic recording medium by using a head for perpendicular magnetic recording. In the test, the head was slid by means of a piezoelectric device under a contact state with the medium, not under a floated state. The magnetic recording medium after the recording was observed with an MFM (Magnetic Force Microscope), with the result that the recording had been performed at a period equal to the period of the soft magnetic dots 14. Also, the recorded data were read out of the medium after the recording by using a GMR element so as to obtain reproduction signals synchronous with the period of the soft magnetic dots 14.

Example 2

FIG. 4 is a cross-sectional view schematically showing the structure of the perpendicular magnetic recording medium for this Example. The perpendicular magnetic recording medium was manufactured as follows. First, a soft magnetic underlayer 12 of a multi-layered structure was deposited on a glass substrate disk 11 having a diameter of 2.5 inches by repeating ten times the formation of a unit consisting of a Fe film having a thickness of 8 nm and a carbon film having a thickness of 2 nm by sputtering. Then, a CoZrNb film having a thickness of 30 nm, which was to be processed into soft magnetic dots 14, and a carbon film having a thickness of 1 nm (not shown) were successively deposited. Further, the CoZrNb film and the carbon film were processed by FIB (Focused Ion Beam) so as to form a pattern in which oblongs each sized at 30 nm×20 nm were repeatedly formed at an interval of 30 nm, followed by depositing an Si—N intermediate layer 23 in a thickness of 10 nm. Then, a unit consisting of a Co film having a thickness of 0.3 nm and a Pd film having a thickness of 1 nm was repeatedly deposited ten times so as to form a ferromagnetic recording layer 25 of a multi-layered structure ([Co/Pd] artificial lattice), followed by depositing a carbon film (not shown) having a thickness of 2 nm as a protective film.

The magnetic characteristics of the soft magnetic underlayer 12 and the soft magnetic dots 14 were examined by VSM. The hysteresis was found to be a single-step loop, supporting that exchange coupling was exerted. A sample of the ferromagnetic recording layer 25 alone was prepared separately so as to examine the magnetic characteristics of the recording layer itself. The sample has a perpendicular coercivity of 7 kOe and a longitudinal coercivity of 0.1 kOe. Also, the activation volume of the same sample, which was examined by changing the magnetic field sweep velocity of VSM, was found to be about three times as much as the crystal grain size in the recording layer. It follows that disruption of the exchange coupling among the grains was not sufficiently satisfactory as an ordinary perpendicular magnetic recording medium. However, high stability against the thermal fluctuation can be expected.

A recording/reproducing test was applied to the magnetic recording medium by using a head for a perpendicular magnetic recording. In this test, the head was slid by means of a piezoelectric device under a contact state with the medium, not under a floated state. The magnetic recording medium after the recording was observed with an MFM, with the result that the recording had been performed at a period equal to the period of the soft magnetic dots 14. It is considered reasonable to understand that the amount of the magnetic flux was insufficient in the portion where the soft magnetic dot 14 was not present, resulting in failure to provide magnetic field strength high enough to overcome the high coercivity of the [Co/Pd] artificial lattice. Also, the recorded data were read out of the medium after the recording by using a GMR element so as to obtain reproduction signals synchronous with the period of the soft magnetic dots 14.

Example 3

FIG. 3 is a cross-sectional view schematically showing the structure of the perpendicular magnetic recording medium for this Example. The perpendicular magnetic recording medium was manufactured as follows. In the first step, a NiAl film (not shown) having a thickness of 10 nm, a FeSiAl film having a thickness of 100 nm, which was to be used as a soft magnetic underlayer 12 and to be processed into soft magnetic dots 34, and a Pt film (not shown) having a thickness of 2 nm were formed successively by sputtering on a glass disk substrate 11 having a diameter of 2.5 inches. The NiAl film was intended to control the orientation of the FeSiAl film formed thereon.

In the next step, a resist was applied thereon, followed by processing the resist by pressing a stamper prepared in advance, which had a concentric groove pattern of a groove width of 150 nm, against the resist so as to form concentric grooves in the resist. Then, a PS-PMMA diblock copolymer was applied thereon, followed by annealing the copolymer under a nitrogen atmosphere at 140° C. for 2 hours so as to form a self assembly pattern having a diameter of 40 nm within the grooves noted above. Further, the self assembly pattern was selectively removed by means of RIE using $CF_4$, followed by coating the entire surface with SOG (spin-on-glass) and subsequently removing the residual resist by a lift-off method so as to form a mask pattern in the portion from which the self assembly pattern was removed. The mask pattern was formed along the grooves, and four dots were arrayed in the width direction of the groove. Incidentally, if it is possible to embed selectively SOG in the portion from which the self assembly pattern was removed in the mask pattern forming process, it is possible to omit the lift-off process noted above. In this case, it is possible to selectively remove by etching the residual resist from the mask pattern formed of SOG.

Then, ion milling was performed using the mask pattern so as to apply patterning to the surface of the FeSiAl film. By this process, only the portion where the mask pattern was not formed was selectively etched, with the result that it was possible to form a pattern having a cross-sectional shape as shown in FIG. 3 on the surface of the FeSiAl film. It should be noted that the FeSiAl film corresponds to the combination of the soft magnetic underlayer 12 and the soft magnetic dots 34, in which the surface pattern of the FeSiAl film corresponds to the soft magnetic dots 34. The processing depth for the surface of the FeSiAl film was about 20 nm.

In the next step, the mask pattern was removed, followed by depositing again a Si—N intermediate layer 33 by sputtering, and subsequently repeating ten times the formation of a unit consisting of a Co film having a thickness of 0.3 nm and a Pd film having a thickness of 1 nm so as to form a ferromagnetic recording layer 15 of a multi-layered structure ([Co/Pd] artificial lattice), and further a carbon film (not shown) having a thickness of 2 nm as a protective film was deposited.

A recording/reproducing test was applied to the magnetic recording medium by using a head for a perpendicular magnetic recording. In this test, the head was slid by means of a piezoelectric device under a contact state medium, not under a floated state. The magnetic recording medium after the recording was observed with an MFM, with the result that the recording had been performed at a period equal to the period of the soft magnetic dots 14. It is considered reasonable to understand that the amount of the magnetic flux was insufficient in the portion where the soft magnetic dot 14 was not present, resulting in failure to provide magnetic field strength high enough to overcome the high coercivity of the [Co/Pd] artificial lattice. Also, the recorded data were read out of the medium after the recording by using a GMR element so as to obtain reproduction signals synchronous with the period of the soft magnetic dots 14.

Example 4

FIG. 5 is a cross-sectional view schematically showing the structure of the perpendicular magnetic recording medium for this Example. The perpendicular magnetic recording medium was manufactured as follows. In the first step, on a glass substrate disk having a diameter of 2.5 inches, a NiAl film (not shown) having a thickness of 10 nm, a soft magnetic underlayer 12 of a FeTaC film having a thickness of 80 nm, a nonmagnetic intermediate layer 53 of a Cr film having a thickness of 2 nm, a ferromagnetic recording layer 55 of a CoCrTa film having a thickness of 15 nm, a carbon film (not shown) having a thickness of 1 nm, and a SiO$_2$ film (not shown) having a thickness of 50 nm were successively deposited by sputtering. Then, a resist was applied thereon, followed by forming a resist mask, in which square patterns each sized at 40 nm-square were arrayed at an interval of 40 nm in the circumferential direction of the disk, by the technology similar to ordinary lithography.

In the next step, a W film was formed on the entire surface, followed by patterning the W film by a lift-off method for removing the residual resist portion. Then, holes corresponding to soft magnetic dots were formed in a SiO$_2$ film by RIE (Reactive Ion Etching) with CF$_4$ using the W mask. Further, a CoZrNb film used for forming soft magnetic dots 54 was deposited, followed by planarizing the CoZrNb film by chemical mechanical polishing and subsequently deposited a carbon film (not shown) having a thickness of 5 nm as a protective film.

A recording/reproducing test was applied to the magnetic recording medium by using a head for perpendicular magnetic recording. The flying height at which a sufficient recording/reproducing can be performed was estimated by changing the rotating speed of the disk so as to change the flying height of the head. In another experiment using a sliding head, it was confirmed that the recording and reproduction described previously in conjunction with Examples 1 to 3 can be performed. Therefore, in this experiment, the magnetic field was applied corresponding to one complete circumference of the disk in recording so as to judge from reproduction signals whether or not the recording was performed sufficiently.

In a magnetic recording medium without the soft magnetic dots 54, the medium noise was rapidly increased under the flying height of 20 nm or more (nominal value). This indicates that it is impossible to perform sufficient recording under the flying height not lower than the value given above. However, in the magnetic recording medium including the soft magnetic dots 54, such an increase in the noise was not recognized until the flying height was increased to 40 nm. In conclusion, it has been found that, in the case of employing the structure shown in FIG. 5, it is possible to perform the recording even if the flying height is increased, and that the upper limit of the flying height is substantially equal to the distance between the adjacent soft magnetic dots 54.

Example 5

FIG. 9 is a cross-sectional view schematically showing the structure of the perpendicular magnetic recording medium for this Example. The perpendicular magnetic recording medium was prepared as follows. In the first step, on a glass disk substrate 11 having a diameter of 2.5 inches, a soft magnetic underlayer 12 of a CoZrNb film having a thickness of 80 nm, a nonmagnetic intermediate layer 53 of a Si—N film having a thickness of 5 nm, a ferromagnetic recording layer 75 consisting of an amorphous TbFeCo film having a thickness of 20 nm, a nonmagnetic layer 53 of a Si—N film having a thickness of 2 nm, a CoZrNb film having a thickness of 30 nm, which was used for forming the soft magnetic dots 54, and a protective film (not shown) of carbon film having a thickness of 2 nm were successively deposited by sputtering. Then, the CoZrNb film and the carbon film were processed by FIB to form a pattern in which square dots each sized at 40 nm-square were repeatedly arrayed at an interval of 40 nm. Further, grooves 75a were formed in the surface region of the amorphous TbFeCo film (i.e., the ferromagnetic recording layer 75) positioned between the adjacent soft magnetic dots 54 by FIB processing. The processing depth width of the amorphous TbFeCo film for the grooves was about 10 nm. The period of the grooves 75a was equal to the period of the soft magnetic dots 54. Also, the width of the groove 75a was about 20 nm, which was half the distance between the adjacent soft magnetic dots 54.

A sample of the ferromagnetic recording layer 75 alone was prepared separately so as to examine the magnetic characteristics of the recording layer itself. The ratio of the rare earth element (Tb) to the transition metal (FeCo) was found to be close to the compensating composition, and the coercivity was found to be about 15 kOe.

A recording/reproducing test was applied to the magnetic recording medium by using a head for perpendicular magnetic recording. In this test, the head was slid by means of a piezoelectric device under a contact state with the medium, not under a floated state. The recorded data were read out of the medium after the recording by using a GMR element so as to obtain reproduction signals synchronous with the period of the soft magnetic dots 14. The amorphous TbFeCo recording layer is a continuous film, and magnetic domains are formed by formation of domain wall. It is considered reasonable to understand that, since the perpendicular magnetic recording medium has a cross-sectional structure as shown in FIG. 9, the processed portion for the groove forms the pinning center so as to suppress the progress of the domain wall. It is also considered reasonable to understand that magnetization reversal was attained for a ferromagnetic recording layer having a very high coercivity of about 15 kOe owing to the presence of the soft magnetic dots 54.

Example 6

FIG. 10 is a cross-sectional view schematically showing the structure of the perpendicular magnetic recording medium for this Example. Example 6 was substantially equal to Example 5, except that the FIB processing was performed for a longer time in Example 6. To be more specific, the amorphous TbFeCo film having a thickness of 20 nm was completely separated into a plurality of ferromagnetic recording regions 85a.

A recording/reproducing test was applied to the perpendicular magnetic recording medium as in each of the Examples described previously, with the result that the reproduction output was found to be twice as much as that in the Examples described previously. It is considered reasonable to understand that, since the TbFeCo medium was completely separated into ferromagnetic recording regions 85a, the reversal unit was formed of a single ferromagnetic recording region 85a, with the result that the magnetization transition region was formed more completely.

Example 6 produces a merit of a high output despite of a disadvantageous that a long time is required for processing. It should be noted, however, that, since the ferromagnetic recording regions 85 are isolated from each other, Example 6 was inferior to each of the other Examples in the resistance to the thermal fluctuation.

Example 7

This Example is equal to Example 1, except that the soft magnetic dot 14 had a thickness not larger than 100 nm.

Since the magnetic flux is concentrated with increase in the thickness of each of the soft magnetic dots, the recording/reproducing efficiency is improved. However, since the processed shape has a large aspect ratio, the processing cost is much increased. Also, the processing accuracy is lowered. In view of the situation that the size of the pattern in the in-plane direction and the distance between the adjacent patterns is scores of nanometers, it is undesirable for the soft magnetic dot 14 to have a thickness exceeding 100 nm because the problems of processing cost and processing accuracy are rendered serious.

Figure 11:
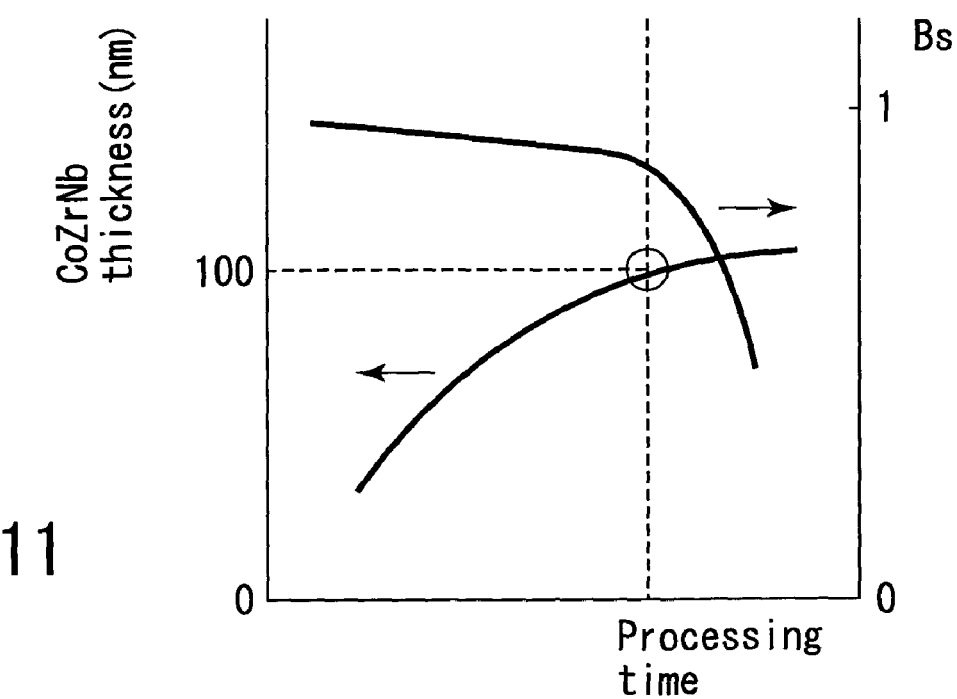
FIG. 11 is a graph showing the relationship between the processing time and Bs with respect to CoZrNb films having a varied thickness.

The present inventor deposited CoZrNb films on the glass substrate 11 in various thicknesses, and samples having dots each processed into a size of 50 nm×50 nm by FIB were prepared. The CoZrNb films were processed to reach the substrate, and the magnetic characteristics after the processing were measured so as to estimate saturated magnetic flux density Bs. FIG. 11 is a graph showing the results. In FIG. 11, the abscissa represents the time required for completely processing the CoZrNb film deposited in a prescribed thickness. The time, which is dependent on the apparatus used, was graduated arbitrarily. The ordinate on the left side represents the thickness of the CoZrNb film, and the ordinate on the right side represents the estimated value of the saturated magnetic flux density Bs, which is normalized by the value in the case where the thickness of the CoZrNb film is 10 nm. As apparent from FIG. 11, the processing time is rendered longer with increase in the thickness of the CoZrNb film (soft magnetic dot 14). However, the line is not linear, indicating that processing efficiency is rendered poor with increase in the thickness of the CoZrNb film. Also, damage to the CoZrNb film (soft magnetic dot 14) is accumulated with progress of the processing so as to deteriorate the saturated magnetic flux density Bs. The thickness of the CoZrNb film in the processing time at which the magnetic flux density Bs is markedly deteriorated, i.e., 3 minutes in this experiment, is found to be about 100 nm. In other words, the deterioration in the magnetic flux density Bs is held relatively small if the thickness of the CoZrNb film is up to 100 nm. Also, the processing efficiency is not appreciably deteriorated in this case.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording medium, comprising:
   a substrate;
   a soft magnetic underlayer formed on the substrate;
   a nonmagnetic layer formed on the soft magnetic underlayer;
   a ferromagnetic recording layer formed on the nonmagnetic layer and having magnetic anisotropy in a direction perpendicular to a surface of the substrate; and
   arrayed soft magnetic dots formed on the ferromagnetic recording layer.

2. The perpendicular magnetic recording medium according to claim 1, further comprising a nonmagnetic layer between the ferromagnetic recording layer and the soft magnetic dots.

3. The perpendicular magnetic recording medium according to claim 1, wherein a thickness of the soft magnetic dots is 100 nm or less.

4. A perpendicular magnetic recording medium, comprising:
   a substrate;
   a soft magnetic underlayer formed on the substrate;
   a nonmagnetic layer formed on the soft magnetic underlayer;
   arrayed ferromagnetic recording regions defined by grooves engraved in a ferromagnetic layer formed on the nonmagnetic layer, the ferromagnetic recording regions having magnetic anisotropy in a direction perpendicular to a surface of the substrate; and
   arrayed soft magnetic dots formed on the respective ferromagnetic recording regions.

5. The perpendicular magnetic recording medium according to claim 4, further comprising a nonmagnetic layer between the ferromagnetic recording regions and the soft magnetic dots.

6. The perpendicular magnetic recording medium according to claim 4, wherein a thickness of the soft magnetic dots is 100 nm or less.

7. The perpendicular magnetic recording medium according to claim 4, wherein a depth of the grooves is smaller than a thickness of the ferromagnetic layer.

8. The perpendicular magnetic recording medium according to claim 4,
   wherein the grooves reach the nonmagnetic layer.

* * * * *